United States Patent
Hamilton, II et al.

(10) Patent No.: US 7,107,330 B1
(45) Date of Patent: Sep. 12, 2006

(54) DATA PROCESSING SYSTEM AND METHOD FOR DISTRIBUTING A DEVICE DRIVER TO A PLURALITY OF CLIENT COMPUTER SYSTEMS EACH EXECUTING DIFFERENT OPERATING SYSTEMS

(75) Inventors: Rick Allen Hamilton, II, Charlottesville, VA (US); Steven Jay Lipton, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 988 days.

(21) Appl. No.: 09/710,922

(22) Filed: Nov. 9, 2000

(51) Int. Cl.
G06F 15/177 (2006.01)
G06F 15/16 (2006.01)
G06F 9/44 (2006.01)

(52) U.S. Cl. ............. 709/221; 709/219; 717/170; 717/173

(58) Field of Classification Search ......... 709/217–222
See application file for complete search history.

(56) References Cited

U.S. PATENT DOCUMENTS

| | | | |
|---|---|---|---|
| 5,557,740 A * | 9/1996 | Johnson et al. ............... 714/38 |
| 5,623,696 A * | 4/1997 | Johnson et al. ............. 719/326 |
| 5,732,275 A * | 3/1998 | Kullick et al. .............. 717/170 |
| 5,742,829 A * | 4/1998 | Davis et al. ................. 717/178 |
| 5,752,032 A * | 5/1998 | Keller et al. ................. 719/311 |
| 5,842,024 A * | 11/1998 | Choye et al. ................ 717/178 |
| 5,872,956 A * | 2/1999 | Beal et al. ................... 709/224 |
| 6,044,367 A | 3/2000 | Wolff ............................ 707/2 |
| 6,101,508 A | 8/2000 | Wolff ......................... 707/218 |
| 6,148,323 A * | 11/2000 | Whitner et al. ............. 718/105 |
| 6,148,346 A * | 11/2000 | Hanson ....................... 719/321 |
| 6,202,147 B1 * | 3/2001 | Slaughter et al. ............... 713/1 |
| 6,282,712 B1 * | 8/2001 | Davis et al. ................. 717/170 |
| 6,381,742 B1 * | 4/2002 | Forbes et al. ............... 717/176 |
| 6,418,555 B1 * | 7/2002 | Mohammed ................. 717/169 |
| 6,470,375 B1 * | 10/2002 | Whitner et al. ............. 718/105 |
| 6,507,948 B1 * | 1/2003 | Curtis et al. ................. 717/174 |
| 6,513,159 B1 * | 1/2003 | Dodson ....................... 717/178 |
| 6,678,888 B1 * | 1/2004 | Sakanishi ................... 717/172 |

* cited by examiner

*Primary Examiner*—Jason Cardone
*Assistant Examiner*—Thomas Duong
(74) *Attorney, Agent, or Firm*—Duke W. Yee; David A. Mims, Jr.; Hope Shimabuku (57) ABSTRACT

A data processing system and method are disclosed for automatically installing a device driver on a plurality of client computer systems which are each executing a different operating system. The data processing system includes a server computer system coupled to the client computer systems via a network. These client computer systems are the systems which are to receive and install the device driver. Different versions of the device driver are created and stored within the server computer system. One of the different versions is copied to one of the client computer systems. The version of the device driver that is copied is the version which is executable by this operating system being executed by the client. The server computer system then causes the client computer system to install this version of the device driver on the client.

15 Claims, 4 Drawing Sheets

DATA PROCESSING SYSTEM AND METHOD FOR DISTRIBUTING A DEVICE DRIVER TO A PLURALITY OF CLIENT COMPUTER SYSTEMS EACH EXECUTING DIFFERENT OPERATING SYSTEMS

BACKGROUND OF THE INVENTION

1. Technical Field

The present invention relates to data processing systems, and further to a data processing system including a server computer system coupled to multiple client computer systems for permitting the server to distribute a device driver to the client computer systems which are each executing a different operating system. More particularly, the present invention relates to a data processing system for distributing a device driver to multiple client computer systems, each executing a different operating system, by copying one of a plurality of different executable versions of the device driver to a client and causing the client to install the version on the client.

2. Description of Related Art

A major shift has occurred in recent years away from traditional mainframe computer systems to a client-server, distributed computer system model. Today, organizations have hundreds or even thousands of distributed servers installed throughout their enterprises, each having more processing power than the mainframe of just a few years ago.

Data storage, for the most part, is still directly connected to a dedicated channel to the particular server which it supports.

Problems occur, however, when such dedicated channels are maintained. When a computational resource needs data which is managed by one of its peers, it must query the peer with a request to provide this data. This results in a loss of effectiveness for the serving machine as it takes the time to honor the request. Also, directly attached disks lead to hardware inefficiencies, whereby one server may be out of disk space even as one of its peers has plenty of storage space to spare. Unfortunately, in this model, the machine with the shortage has no way to directly access the extra space available on its peer's disks. Finally, it is difficult to scale capacity and performance to meet rapidly changing requirements, such as the explosive growth of e-business applications.

Recognizing the limitations of traditional storage architectures such as described above, systems architects have developed a new solution known as a Storage Area Network (SAN). The SAN provides a high-speed connection between servers which permits any resources coupled to it to access a common storage device pool. The SAN eliminates the traditional dedicated connection between a server and a storage device along with the concept that the server "owns and manages" the storage devices. The SAN introduces the flexibility of networking to enable one server or many heterogeneous servers to share a common storage utility which may comprise many storage devices. The SAN is unencumbered by geographical proximity, instead relying only upon persistent communications links. The SAN changes the server-centric model of the typical open systems information infrastructure, replacing it with a data-centric infrastructure.

One problem facing SAN implementation is present with other technologies as well. In such an environment it is time-consuming and can be difficult to effectively distribute SAN device drivers across a widespread, heterogeneous network. The device drivers may need to be installed upon Windows NT, AIX, Solaris, or other operating systems. Currently, in order to distribute the device drivers, an administrator must go to each target server, determine which operating system the target system is executing, select the device driver for that operating system, log-on to that system, and perform the device driver installation on that system before going to the next target system.

Thus, it would be beneficial to have an apparatus and method for distributing a device driver to multiple client computer systems where each client system is executing a different operating system.

SUMMARY OF THE INVENTION

A data processing system and method are disclosed for automatically installing a device driver on a plurality of client computer systems which are each executing a different operating system. The data processing system includes a server computer system coupled to the client computer systems via a network. Each of the client computer systems executes a different operating system. Particular client computer systems are specified. These client computer systems are the systems which are to receive and install the device driver. Different versions of the device driver are created and stored within the server computer system. Each of the different versions of the device driver is executable by a different one of the operating systems. One of the different versions is copied to one of the client computer systems. This client computer system is executing one of the operating systems. The version of the device driver that is copied is the version which is executable by this operating system being executed by the client. The server computer system then causes the client computer system to install this version of the device driver on the client.

Other features and advantages of the present invention will be described in, or will become apparent to those of ordinary skill in the art in view of the following detailed description of the preferred embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

A preferred embodiment of the present invention and its advantages are better understood by referring to FIGS. 1–7 of the drawings, like numerals being used for like and corresponding parts of the accompanying drawings.

The invention is preferably realized using a well-known computing platform, such as an IBM RS/6000 workstation running the IBM AIX operating system. However, it may be realized in other popular computer system platforms, such as an IBM personal computer running the OS/2 operating system or a Sun Microsystems workstation running alternate operating systems such as Microsoft Windows, HP-UX, UNIX or LINUX, without departing from the spirit and scope of the invention.

The present invention is a method and system for automatically installing a device driver on a plurality of heterogeneous client computer systems. A data processing system includes a server computer system coupled to client computer systems via a network. Each of the client computer systems executes a different operating system.

First, one or more device drivers are specified. Various different operating systems are also specified. A first device driver is then selected. Different versions of the device driver are then created and stored in the server computer system. Each version of the device driver is executable by a different one of the operating systems. In this manner, several different versions of the device driver are created and stored, one for each operating system.

A file is also created within the server computer system. Each client computer system selected to receive and install the device driver is listed within the file. The file includes multiple entries, one for each client computer system on which to install the device driver. Each entry also identifies the operating system being executed by the client computer system associated with the entry, as well as the network address of the client computer system.

When the device driver is to be automatically installed on the multiple, different heterogeneous client computer systems which are executing different operating systems, the server computer system retrieves the file. The first entry in the file is retrieved. The operating system being executed by the client computer system associated with the first entry is determined.

The server computer system then copies the version of the driver which is executable by this operating system to the client computer system identified by the first entry. The server computer system then causes this client computer system to install the version of the device driver the client received from the server.

Figure 1:
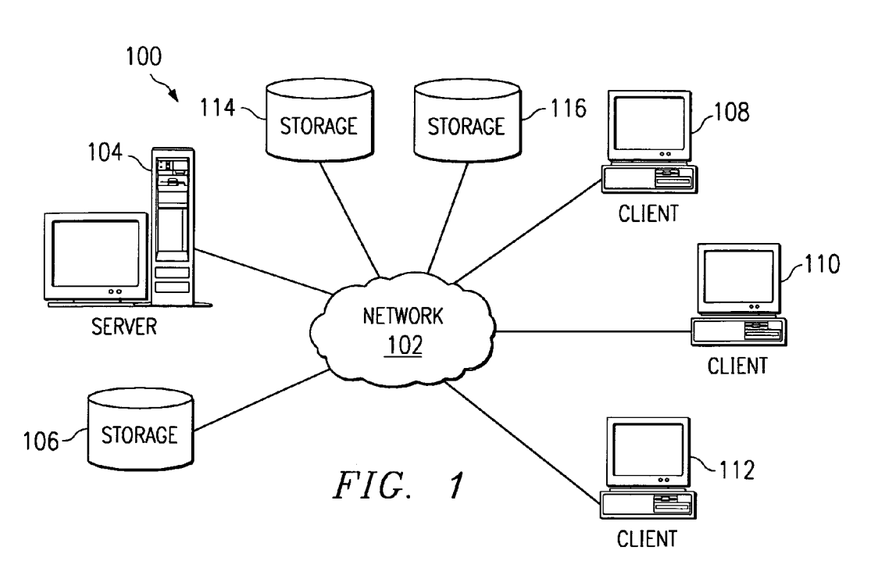
FIG. 1 is a pictorial representation of a distributed data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage units 106, 114, and 116. Alternatively, storage 106 may be coupled directly to server 104 with storage unit 114 coupled to client 108, for example, with storage unit 116 coupled to client 110. A storage unit may, alternatively, be directly connected to server 104 with network 102 connected to clients 108, 110 and 112 in a Network File System (NFS) configuration. Finally, server 104 and clients 108, 110, and 112 could all be directly connected to the same storage units 106, 114, and 116 in a Storage Area Network (SAN) configuration.

In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Clients 108, 110, and 112 are preferably each executing a different operating system. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
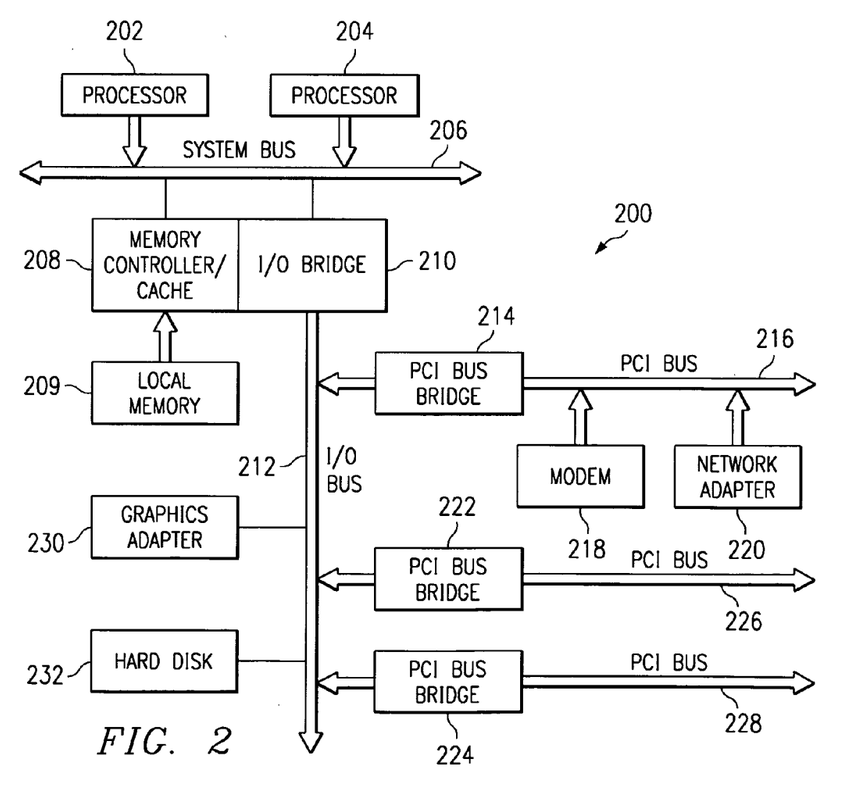
FIG. 2 is a block diagram of a data processing system that may be implemented as a server computer system, such as server 104 shown in FIG. 1, in accordance with the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
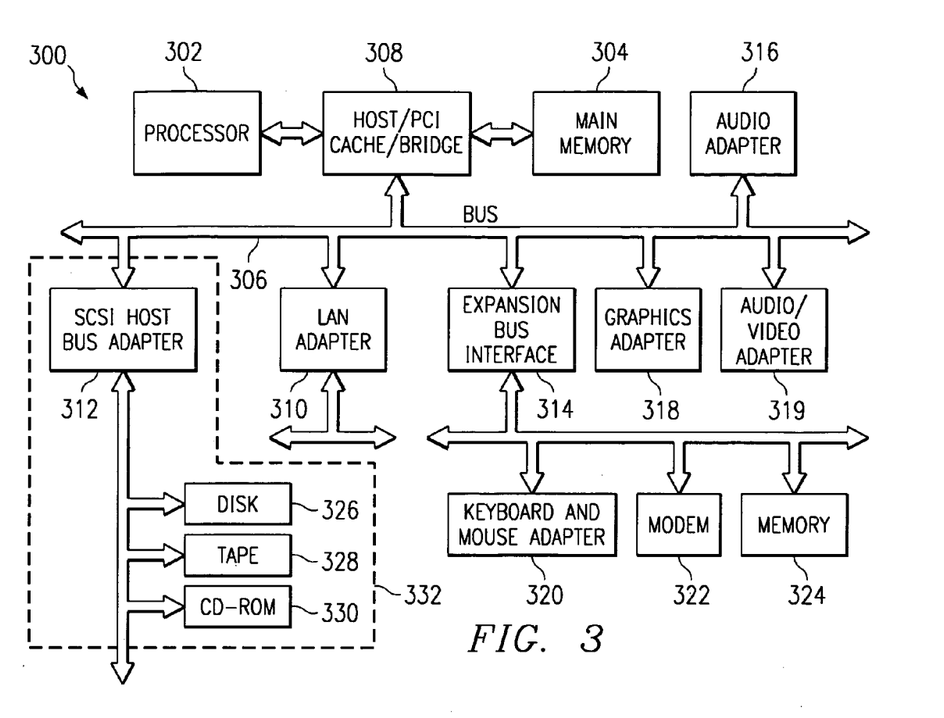
FIG. 3 is a block diagram of a data processing system that may be implemented as a client computer system, such as one of the clients 108, 110, or 112 shown in FIG. 1, in accordance with the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. Preferably, each client will be executing a different operating system. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4A:
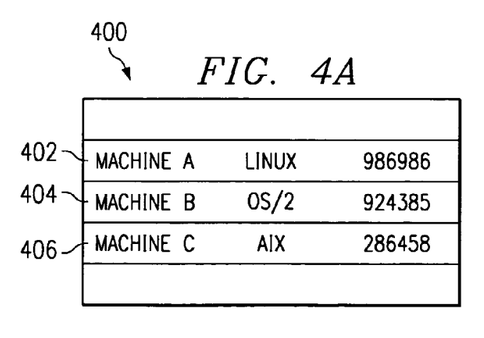
FIG. 4A is a pictorial representation of a file which includes a listing of machines on which a device driver is to be installed in accordance with the present invention.

FIG. 4A is a pictorial representation of a file 400 which includes a listing of client computer systems on which a device driver is to be installed in accordance with the present invention. File 400 includes a plurality of records, or entries. Each record, or entry includes an identity of a client, or "machine", the operating system being executed by that client, and the network address for the client. File 400 can be utilized to automatically install one or more device drivers on remote machines. File 400 is not associated with any one particular device driver. File 400 includes a plurality of entries, such as entries 402, 404, and 406. Entry 402 indicates that a remote machine, "machine A", is executing the LINUX operating system. Further, machine A is located at a network address "986986". Entry 404 indicates that a remote machine, "machine B", is executing the OS/2 operating system and is located at a network address "924385". And, entry 406 indicates that a remote machine, "machine C", is executing the AIX operating system and is located at a network address "286458".

When the present invention is executed, file 400 is used to automatically install a selected device driver on machines A, B, and C. File 400 may be utilized to install multiple, different device drivers.

Figure 4B:
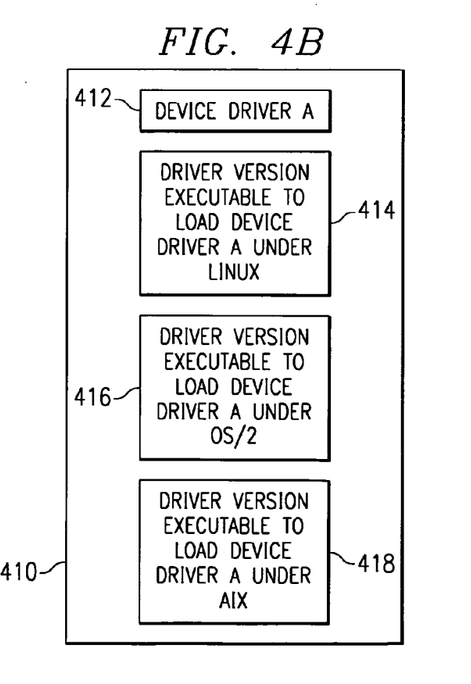
FIG. 4B is a pictorial representation of a device driver and multiple, different versions of the device driver capable of being executed using multiple, different operating systems in accordance with the method and system of the present invention.

FIG. 4B is a pictorial representation of a device driver and multiple, different versions of the device driver capable of being executed using multiple, different operating systems in accordance with the method and system of the present invention. A device driver A 412 is stored in a storage device 410. Storage device 410 may be implemented utilizing any suitable storage device, such as storage 106.

Different versions of device driver A 412 have been created and stored in storage device 410. A version of device driver A 412 has been created to be executed by LINUX, a version to be executed by OS/2, and a version to be executed by AIX. For example, driver version 414 has been created which is executable by LINUX. Driver version 416 has been created which is executable by OS/2. And, driver version 418 has been created which is executable by AIX.

When a computer system executes the present invention, a device driver is selected, such as device driver A 412. Versions of device driver A 412 are then created for selected operating systems. These versions are then saved for later use.

A file can then be created which includes each remote machine which is to have the selected driver installed. The file includes a plurality of entries. Each entry identifies each selected machine, the operating system being executed by the machine, and the network address of the machine.

Then, when the present invention is executed, the file is used. Each entry in the file is retrieved by the server. First, the operating system being executed by the machine identified in the first entry is determined by the server. The server then retrieves the driver version created for this operating system and copies it to the machine at the network address identified in the entry. The server then causes the remote machine to execute an INSTALL command in order to install the copy of the version copied to the remote machine on the remote machine.

For example, when file 400 is used, entry 402 is first retrieved. A determination is made that "machine A" is executing LINUX. Therefore, driver version 414 is retrieved and copied to the machine at network address "986986". Machine A at network address "986986" is then caused to execute an INSTALL command to install the copy of driver version 414 on machine A.

File 400 may be utilized to install multiple, different device drivers. After a first device driver is distributed to and installed on the selected machines, another device driver may be selected where this second device driver also has multiple versions created and stored which are executable by different operating systems. File 400 is then used as described above to distribute the second device driver to the machines identified by file 400.

Figure 5:
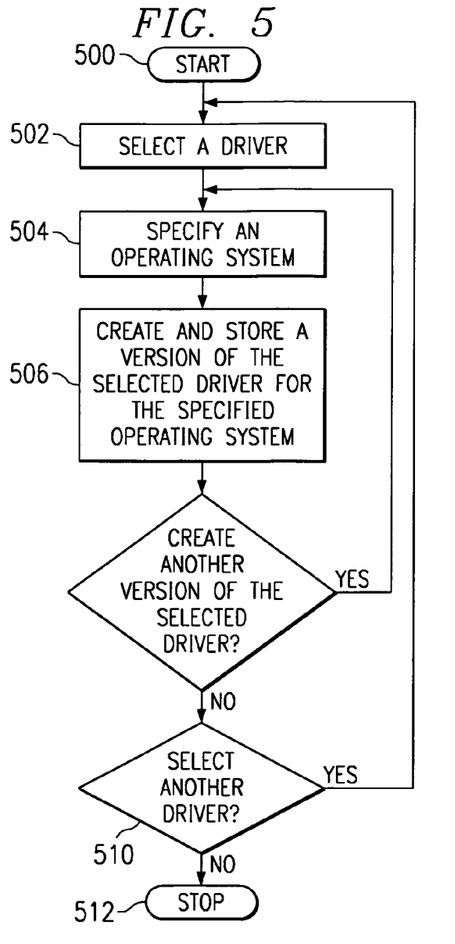
FIG. 5 is a high level flow chart which depicts the creation of a plurality of different versions of a device driver for different ones of a plurality of operating systems in accordance with the present invention.

FIG. 5 is a high level flow chart which depicts the creation of a plurality of different versions of a device driver for different ones of a plurality of operating systems in accordance with the present invention. The process starts as depicted by block 500 and thereafter passes to block 502 which illustrates selecting a device driver to install on remote computer systems. These remote computer systems are also referred to as remote "machines". The remote machines will typically be executing different operating systems. Some of the remote machines may be executing LINUX, others may be executing AIX, still others may be executing OS/2, and others may be executing yet a different operating system. The process then passes to block 504 which depicts specifying an operating system. Next, block 506 illustrates creating and storing an executable version of this selected driver which is capable of being executed by the specified operating system. Therefore, for example, if AIX was specified, an executable file is created which is a version of the driver which can be executed by AIX. Thereafter, block 508 depicts a determination of whether or not another version of the driver is to be created. If a determination is made that another version is to be created, the process passes back to block 504 in order to select another, different operating system. Referring again to block 508, if a determination is made that no other versions of this driver are to be created, the process passes to block 510 which illustrates a determination of whether or not another driver is to be selected in order to create and store different executable versions for that driver. If a determination is made that another driver is to be selected, the process passes back to block 502 in order to repeat this process for another driver. Different versions can then be created for this driver which can be executed by selected operating systems. Referring again to block 510, if a determination is made that no other drivers are to be selected, the process terminates as illustrated by block 512.

Figure 6:
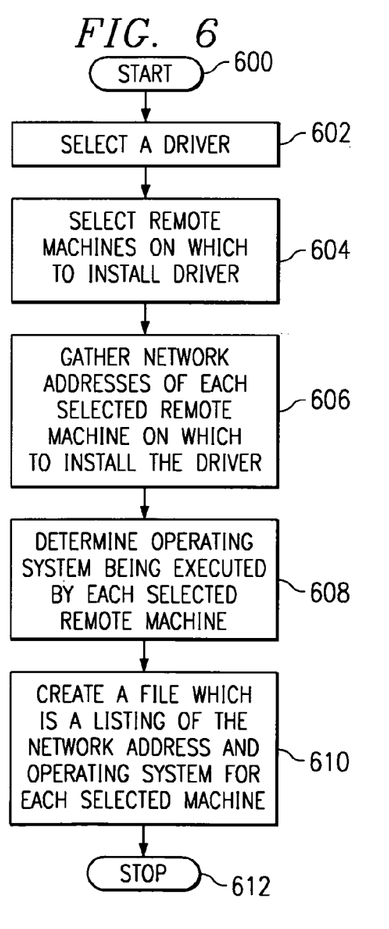
FIG. 6 is a high level flow chart which depicts a creation of a file which includes a listing of machines selected to have a driver installed and the operating systems and network addresses of each machine in accordance with the present invention.

FIG. 6 is a high level flow chart which depicts a creation of a file which includes a listing of machines selected to have a driver installed and the operating systems and network addresses of each machine in accordance with the present invention. The process starts as depicted by block 600 and thereafter passes to block 602 which illustrates selecting a driver. Next, block 604 depicts selecting remote machines on which to install a device driver. Thereafter, block 606 illustrates the computer system which is executing this process gathering a network address of each selected remote machine on which the driver is to be installed. The process then passes to block 608 which depicts the computer system which is executing this process determining which operating system is being executed by each selected remote machine. Then, block 610 illustrates the computer system creating a file, such as file 400. This file a listing of each selected remote machine, and the operating system and network address for each remote machine. The process then terminates as depicted by block 612.

Figure 7:
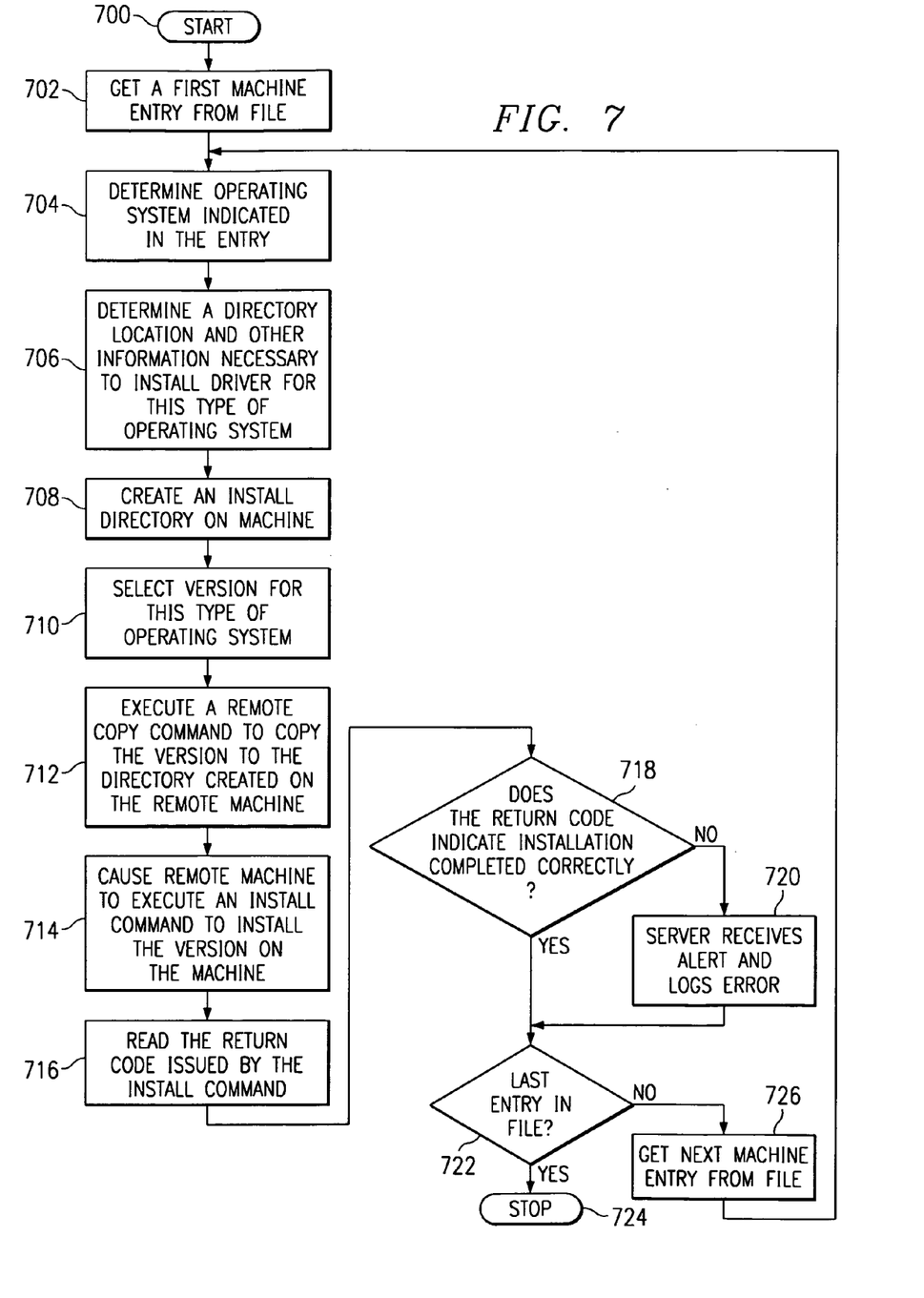
FIG. 7 is a high level flow chart which illustrates a server computer system causing the installation of a device driver on multiple, different machines which are executing multiple, different operating systems in accordance with the present invention.

FIG. 7 is a high level flow chart which illustrates a server computer system causing the installation of a device driver on multiple, different machines which are executing multiple, different operating systems in accordance with the present invention. The process starts as depicted by block 700 and thereafter passes to block 702 which illustrates the server getting a first entry from the file for a first remote machine on which the driver is to be installed. The first entry identifies a particular remote machine, the operating system being executed by the machine, and the network address of the machine. Next, block 704 depicts the server determining the operating system indicated in the entry. The process then passes to block 706 which illustrates the server determining a directory location within the machine within which to install the device driver. Any other commands required by the particular machine and its operating system are also determined.

Thereafter, block 708 depicts the server creating an install directory on the remote machine. Next, block 710 illustrates the server selecting a version of the device driver which is executable by the operating system determined as depicted by block 704. Block 712, then, illustrates the server computer system executing a remote COPY command to copy the selected version of the device driver to the directory created on the remote machine. Next, block 714 depicts the server computer system causing the remote machine to execute an INSTALL command. The INSTALL command will then cause the selected version to be installed on the remote machine. Thereafter, block 716 illustrates the server computer system reading the return code issued by the INSTALL command. Block 718, then, depicts the server determining whether or not the return code indicates that the installation completed correctly. If a determination is made that the return code indicates that the installation did not complete correctly, the process passes to block 720 which illustrates the server receiving an alert and logging the installation error. The process then passes to block 722. Referring again to block 718, if a determination is made that the return code indicates that the installation did complete correctly, the process passes to block 722.

Block 722 depicts a determination of whether or not this is the last entry in the file list. If a determination is made that this is the last entry, the process terminates as depicted by block 724. Referring again to block 722, if a determination is made that this is not the last entry in the file, the process passes to block 726 which illustrates the server getting the next machine entry from the file. The process then passes back to block 704 in order to install a version of the driver on another remote machine.

The present invention provides a method and system for distributing a device driver automatically to a plurality of different types of client computer systems. A file is created which is a listing of each client computer system which is to receive the device driver. The listing includes a plurality of records. Each record includes an identity of a particular remote client computer system, the operating system being executed by the particular computer system, and the network address of the particular computer system. In addition, an executable version of the device driver is created and stored for each one of a plurality of different operating systems.

When a device driver is to be distributed, the file is queried to obtain the identity of the first remote computer system, its operating system, and its network address. The version of the driver which is executable by this operating system is then obtained and copied to the computer system at the network address obtained from the record. The remote computer system is then caused to install the file. After this process is complete, the next record of the file is obtained, and the appropriate executable file is copied to and installed on the remote computer system.

In this manner, a device driver may be easily installed on many different computer systems which are each executing different operating systems.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system including a server computer system coupled to a plurality of heterogeneous client computer systems via a network for automatically installing a device driver on said plurality of heterogeneous client computer systems, wherein each of said heterogeneous client computer systems executes a different one of a plurality of operating systems, said method comprising the steps of:

selecting a device driver to be installed;

specifying said plurality of heterogeneous client computer systems to receive said device driver;

storing a plurality of different versions of said device driver in said server computer system, wherein each one of said plurality of different versions is executable by only a different one of said plurality of operating systems;

gathering, by said server computer system, a network address of each one of said plurality of client computer systems;

determining, by said server computer system, one of said plurality of operating systems being executed by each one of said plurality of client computer systems;

creating, in said server computer system, a file including a plurality of entries, each one of said plurality of entries specifying a different one of said plurality of client computer systems, one of said plurality of different operating systems determined for said one of said plurality of client computer systems, and said network address determined for said one of said plurality of client computer systems; and distributing, by said server computer system, said plurality of versions of said device driver to said plurality of client computer system utilizing said file by;

getting an entry from said file;

creating an install directory on said one of said plurality of client computer systems that is specified in said entry;

determining an operating system listed in said entry;

selecting one of said plurality of different versions of said device driver that is executable by said determined one of said plurality of different operating systems;

executing a remote copy command to copy said selected one of said plurality of different versions of said device driver to said install directory created on said one of said plurality of client computer systems that is specified by said entry, said remote copy command utilizing said network address that is specified in said entry;

causing, by said server computer system said one of said plurality of client computer systems that is specified by said entry to execute an install command to install said selected one of said plurality of different versions of said device driver;

repeating said step of distributing said plurality of versions for each one of said plurality of entries of said file.

2. The method according to claim 1, wherein the step of distributing said plurality of versions of said device driver further comprises the steps of:

getting a first entry from said file utilizing said server computer system;

determining a first one of said plurality of operating systems included in said first entry utilizing said server computer system;

determining a network address for a first one of said plurality of client computer systems included in said first entry utilizing said server computer system;

retrieving a first one of said plurality of different versions of said device driver utilizing said server computer system, wherein said first one of said plurality of different versions of said device driver is executable by said first one of said plurality of operating systems; and copying said first one of said plurality of different versions of said device driver to said first one of said plurality of client computer systems at said network address utilizing said server computer system.

3. The method according to claim 2, further comprising the steps of:

said server computer system determining a directory location within said one of said plurality of client computer systems to which to copy said one of said plurality of different versions; and storing said one of said plurality of different versions of said device driver in said directory location within said one of said plurality of client computer systems.

4. The method according to claim 3, further comprising the step of said server computer system causing said one of said plurality of client computer systems to execute an installation command to install said one of said plurality of different versions of said device driver.

5. The method according to claim 4, further comprising the steps of:
getting a second entry from said file utilizing said server computer system;
determining a second one of said plurality of operating systems included in said second entry utilizing said server computer system;
determining a network address for a second one of said plurality of client computer systems included in said second entry utilizing said server computer system;
retrieving a second one of said plurality of different versions of said device driver utilizing said server computer system, wherein said second one of said plurality of different versions of said device driver is executable by said second one of said plurality of operating systems; and
copying said second one of said plurality of different versions of said device driver to said second one of said plurality of client computer systems at said network address utilizing said server computer system.

6. A data processing system including a server computer system coupled to a plurality of heterogeneous client computer systems via a network for automatically installing a device driver on said plurality of heterogeneous client computer systems, wherein each of said heterogeneous client computer systems executes a different one of a plurality of operating systems, comprising:
means for selecting a device driver to be installed;
means for specifying said plurality of heterogeneous client computer systems to receive said device driver;
means for storing a plurality of different versions of said device driver in said server computer systems wherein each one of said plurality of different versions is executable by only a different one of said plurality of operating systems;
said server computer system for gathering a network address of each one of said plurality of client computer systems;
said server computer system for determining one of said plurality of operating systems be executed by each one of said plurality of client computer systems;
said server computer system for creating a file including a plurality of entries, each one of said plurality of entries specifying a different one of said plurality of client computer systems, one of said plurality of different operating systems determined for said one of said plurality of client computer systems, and said network address determined for said one of said plurality of client computer systems; and
said server computer system for distributing said plurality of versions of said device driver to said plurality of client computer systems utilizing said file by:
said server computer system setting an energy from said file;
said server computer system creating an install directory on said one of said plurality of client computer systems that is specified in said entry;
said server computer system determining an operating system listed in said entry;
said server computer system selecting one of said plurality of different versions of said device driver that is executable by said determined one of said plurality of different operating systems;
said server computer system executing a remote copy command to copy said selected one of said plurality of different versions of said device driver to said install directory created on said one of said plurality of client computer systems that is specified by said entry, said remote copy command utilizing said network address that is specified in said entry;
said server computer system causing said one of said plurality of client computer systems that is specified by said entry to execute an install command to install said selected one of said plurality of different versions of said device driver;
means for repeating said distributing of said plurality of versions for each one of said plurality of entries of said file.

7. The system according to claim 6, wherein said means for distributing said plurality of versions of said device driver further comprises:
means for getting a first entry from said file utilizing said server computer system;
means for determining a first one of said plurality of operating systems included in said first entry utilizing said server computer system;
means for determining a network address for a first one of said plurality of client computer systems included in said first entry utilizing said server computer system;
means for receiving a first one of said plurality of different versions of said device driver utilizing said server computer system, wherein said first one of said plurality of different versions of said device driver is executable by said first one of said plurality of operating systems; and
means for copying said first one of said plurality of different versions of said device driver to said first one of said plurality of client computer systems at said network address utilizing said server computer system.

8. The system according to claim 7, further comprising:
means for said server computer system determining a directory location within said one of said plurality of client computer systems to which to copy said one of said plurality of different versions; and
means for storing said one of said plurality of different versions of said device driver in said directory location within said one of said plurality of client computer systems.

9. The system according to claim 8, further comprising means for said server computer system causing said one of said plurality of client computer systems to execute an installation command to install said one of said plurality of different versions of said device driver.

10. The system according to claim 9, further comprising:
means for getting a second entry from said file utilizing said server computer system;
means for determining a second one of said plurality of operating systems included in said second entry utilizing said server computer system;
means for determining a network address for a second one of said plurality of client computer systems included in said second entry utilizing said server computer system;
means for retrieving a second one of said plurality of different versions of said device driver utilizing said server computer system, wherein said second one of said plurality of different versions of said device driver is executable by said second one of said plurality of operating systems; and
means for copying said second one of said plurality of different versions of said device driver to said second one of said plurality of client computer systems at said network address utilizing said server computer system.

11. A computer readable recordable-type media including a server computer system coupled to a plurality of heterogeneous client computer systems via a network for automatically installing a device driver on said plurality of heterogeneous client computer systems, wherein each of said heterogeneous client computer systems executes a different one of a plurality of operating systems, said computer readable media comprising:

instructions for selecting a device driver to be installed;

instruction means for specifying said plurality of heterogeneous client computer systems to receive said device driver;

instruction means for storing a plurality of different versions of said device driver in said server computer system, wherein each one of said plurality of different versions is executable by only a different one of said plurality of operating systems;

instructions for gathering, by said server computer system, a network address of each one of said plurality of client computer systems;

instructions for determining, by said server computer system, one of said plurality of operating systems being executed by each one of said plurality of client computer systems;

instruction means for creating a file including a plurality of entries, each one of said plurality of entries specifying a different one of said plurality of client computer systems, one of said plurality of different operating systems determined for said one of said plurality of client computer systems, and said network address determined for said one of said plurality of client computer systems; and instruction means for distributing said plurality of versions of said device driver to said plurality of client computer systems utilizing said file by:

instructions for setting an entry from said file;

instructions for creating an install directory on said one of said plurality of client computer systems that is specified in said entry;

instructions for determining an operating system listed in said entry;

instructions for selecting one of said plurality of different versions of said device driver that is executable by said determined one of said plurality of different operating systems;

instructions for executing a remote copy command to copy said selected one of said plurality of different versions of said device driver to said install directory created on said one of said plurality of client computer systems that is specified by said entry, said remote copy command utilizing said network address that is specified in said entry;

instructions for causing, by said server computer system, said one of said plurality of client computer systems that is specified by said entry to execute an install command to install said selected one of said plurality of different versions of said device driver;

instructions for repeating said instructions for distributing said plurality of versions for each one of said plurality of entries of said file.

12. The computer readable recordable-type media according to claim 11, wherein said instruction means for distributing said plurality of versions of said device driver further comprises:

instruction means for getting a first entry from said file utilizing said server computer system;

instruction means for determining a first one of said plurality of operating systems included in said first entry utilizing said server computer system;

instruction means for determining a network address for a first one of said plurality of client computer systems included in said first entry utilizing said server computer system;

instruction means for retrieving a first one of said plurality of different versions of said device driver utilizing said server computer system, wherein said first one of said plurality of different versions of said device driver is executable by said first one of said plurality of operating systems; and instruction means for copying said first one of said plurality of different versions of said device driver to said first one of said plurality of client computer systems at said network address utilizing said server computer system.

13. The computer readable recordable-type media according to claim 12, further comprising:

instruction means for said server computer system determining a directory location within said one of said plurality of client computer systems to which to copy said one of said plurality of different versions; and instruction means for storing said one of said plurality of different versions of said device driver in said directory location within said one of said plurality of client computer systems.

14. The computer readable recordable-type media according to claim 13, further comprising instruction means for said server computer system causing said one of said plurality of client computer systems to execute an installation command to install said one of said plurality of different versions of said device driver.

15. The computer readable recordable-type media according to claim 14, further comprising:

instruction means for getting a second entry from said file utilizing said server computer system;

instruction means for determining a second one of said plurality of operating systems included in said second entry utilizing said server computer system;

instruction means for determining a network address for a second one of said plurality of client computer systems included in said second entry utilizing said server computer system;

instruction means for retrieving a second one of said plurality of different versions of said device driver utilizing said server computer system, wherein said second one of said plurality of different versions of said device driver is executable by said second one of said plurality of operating systems; and instruction means for copying said second one of said plurality of different versions of said device driver to said second one of said plurality of client computer systems at said network address utilizing said server computer system.

* * * * *